(12) United States Patent
Lovlekar et al.

(10) Patent No.: US 12,052,616 B2
(45) Date of Patent: Jul. 30, 2024

(54) CONDITIONAL HANDOVERS AND CELL RE-SELECTIONS ALONG KNOWN ROUTES

(71) Applicant: Apple Inc., Cupertino, CA (US)

(72) Inventors: Srirang A. Lovlekar, Cupertino, CA (US); Srinivasan Nimmala, San Jose, CA (US); Haijing Hu, Beijing (CN); Fangli Xu, Beijing (CN); Yuqin Chen, Shenzhen (CN); Longda Xing, San Jose, CA (US); Dawei Zhang, Saratoga, CA (US); Murtaza A. Shikari, Mountain View, CA (US); Sethuraman Gurumoorthy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 613 days.

(21) Appl. No.: 17/286,393

(22) PCT Filed: Nov. 1, 2018

(86) PCT No.: PCT/CN2018/113358
§ 371 (c)(1),
(2) Date: Apr. 16, 2021

(87) PCT Pub. No.: WO2020/087432
PCT Pub. Date: May 7, 2020

(65) Prior Publication Data
US 2021/0360495 A1    Nov. 18, 2021

(51) Int. Cl.
*H04W 4/00*    (2018.01)
*H04W 36/00*    (2009.01)
(Continued)

(52) U.S. Cl.
CPC . *H04W 36/00837* (2018.08); *H04W 36/0094* (2013.01); *H04W 36/08* (2013.01); *H04W 36/305* (2018.08)

(58) Field of Classification Search
CPC ....... H04W 36/00837; H04W 36/0094; H04W 36/08; H04W 36/305; H04W 36/362; H04W 36/00838; H04W 36/30
(Continued)

(56) References Cited

U.S. PATENT DOCUMENTS 7,747,591 B2 *  6/2010  Chatterjee ............... G06F 9/526
                                                707/703
8,437,306 B2 *  5/2013  Attar ...................... H04L 47/10
                                                455/437

(Continued)

FOREIGN PATENT DOCUMENTS

CN         1717104 A      1/2006
CN       101505514 A      8/2009
(Continued)

OTHER PUBLICATIONS

Extended European Search Report for European Patent Application No. 18938915.8; 8 pages; Apr. 28, 2022.
(Continued)

*Primary Examiner* — Amancio Gonzalez
(74) *Attorney, Agent, or Firm* — Kowert, Hood, Munyon, Rankin & Goetzel, P.C.

(57) ABSTRACT

This disclosure relates to techniques for performing conditional handovers and cell re-selections along known routes. A cellular base station may select a conditional handover set for a wireless device. The conditional handover set may include information for multiple conditional handovers. The wireless device may receive the conditional handover set. The wireless device may perform conditional handover to at least a first cell indicated in the conditional handover set based at least in part on the conditional handover set.

20 Claims, 11 Drawing Sheets

(51) Int. Cl.
*H04W 36/08* (2009.01)
*H04W 36/30* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 8,543,155 | B2 * | 9/2013 | Lee ..................... | H04W 36/18 |
| | | | | 455/436 |
| 8,767,739 | B2 * | 7/2014 | Meylan ................ | H04L 69/321 |
| | | | | 370/473 |
| 8,768,357 | B2 * | 7/2014 | Tinnakornsrisuphap | ................... |
| | | | | H04W 36/08 |
| | | | | 455/437 |
| 8,861,475 | B2 * | 10/2014 | Jaiswal ............. | H04W 36/0235 |
| | | | | 455/436 |
| 8,902,852 | B2 * | 12/2014 | Jaiswal ............... | H04W 36/023 |
| | | | | 455/436 |
| 8,923,245 | B2 * | 12/2014 | Jung ................ | H04W 36/0033 |
| | | | | 455/437 |
| 8,995,370 | B2 * | 3/2015 | Pelletier ............. | H04W 40/248 |
| | | | | 370/328 |
| 9,070,973 | B2 * | 6/2015 | Hanisch ............... | H01Q 1/3233 |
| 9,877,253 | B1 * | 1/2018 | Liu ..................... | H04W 52/283 |
| 10,448,304 | B2 * | 10/2019 | Kronestedt ......... | H04W 36/302 |
| 10,542,464 | B2 * | 1/2020 | Narasimha ........ | H04W 36/0009 |
| 10,827,398 | B2 * | 11/2020 | Park .................. | H04W 36/0058 |
| 10,880,895 | B2 * | 12/2020 | Gordaychik .......... | H04W 52/18 |
| 10,939,329 | B2 * | 3/2021 | Wu ....................... | H04W 36/08 |
| 10,993,152 | B2 * | 4/2021 | Kang ................ | H04W 36/0058 |
| 11,108,755 | B2 * | 8/2021 | Sharma ............. | H04W 36/0069 |
| 11,412,429 | B2 * | 8/2022 | Hwang .......... | H04W 36/00835 |
| 11,432,204 | B2 * | 8/2022 | Byun ................ | H04W 36/0009 |
| 11,438,812 | B2 * | 9/2022 | Kadiri ............... | H04W 36/0069 |
| 11,445,562 | B2 * | 9/2022 | Fujishiro ............. | H04W 76/18 |
| 11,490,304 | B2 * | 11/2022 | Wu ................. | H04W 36/00837 |
| 11,510,114 | B2 * | 11/2022 | Yiu .................... | H04W 36/362 |
| 11,540,183 | B2 * | 12/2022 | Xu .................... | H04W 36/0064 |
| 11,683,731 | B2 * | 6/2023 | Bin Redhwan ... | H04W 36/0061 |
| | | | | 370/331 |
| 11,743,785 | B2 * | 8/2023 | Chen ................. | H04W 36/0072 |
| | | | | 370/331 |
| 2009/0086677 | A1 * | 4/2009 | Ho ........................ | H04W 36/02 |
| | | | | 370/331 |
| 2009/0109926 | A1 * | 4/2009 | Meylan ................ | H04W 36/02 |
| | | | | 370/331 |
| 2012/0106505 | A1 * | 5/2012 | Rameshwaran ........ | H04L 69/40 |
| | | | | 370/331 |
| 2012/0129528 | A1 * | 5/2012 | Kobayashi ........ | H04W 36/0016 |
| | | | | 455/436 |
| 2015/0195757 | A1 | 7/2015 | Tietz et al. | |
| 2015/0319668 | A1 | 11/2015 | Guo | |
| 2016/0007243 | A1 * | 1/2016 | Park ..................... | H04W 24/10 |
| | | | | 370/331 |
| 2016/0286410 | A1 * | 9/2016 | O'Malley ............. | G06Q 30/06 |
| 2018/0035348 | A1 | 2/2018 | Axmon et al. | |
| 2018/0279193 | A1 * | 9/2018 | Park ..................... | H04W 36/26 |
| 2019/0281511 | A1 | 9/2019 | Susitaival | |
| 2019/0387440 | A1 * | 12/2019 | Yiu .................... | H04W 36/165 |
| 2020/0154321 | A1 * | 5/2020 | Kang ................ | H04W 36/0058 |
| 2020/0245215 | A1 * | 7/2020 | Han ................... | H04W 88/02 |
| 2020/0322847 | A1 * | 10/2020 | Byun ................ | H04W 36/0009 |
| 2021/0250823 | A1 * | 8/2021 | Fujishiro ............... | H04W 36/36 |
| 2021/0274404 | A1 * | 9/2021 | Koziol ............. | H04W 36/0055 |
| 2021/0297915 | A1 * | 9/2021 | Decarreau ........... | H04W 36/023 |
| 2021/0321306 | A1 * | 10/2021 | Bin Redhwan ....... | H04W 76/27 |
| 2022/0038985 | A1 * | 2/2022 | Deenoo ............... | H04W 36/305 |
| 2022/0053399 | A1 * | 2/2022 | Säily ................ | H04W 36/0058 |
| 2022/0070746 | A1 * | 3/2022 | Yiu ................... | H04W 36/0058 |
| 2022/0386197 | A1 * | 12/2022 | Hwang .......... | H04W 36/00835 |
| 2024/0015626 | A1 * | 1/2024 | Chang .................. | H04W 76/27 |

FOREIGN PATENT DOCUMENTS

| | | |
|---|---|---|
| CN | 103444235 A | 12/2013 |
| CN | 107889145 A | 4/2018 |
| WO | 2018132051 | 7/2018 |
| WO | 2018143703 A1 | 8/2018 |
| WO | 2018172600 | 9/2018 |

OTHER PUBLICATIONS

International Search Report and Written Opinion for PCT/CN2018/113358, dated Jul. 29, 2019, 9 pages.

Office Action for EP Patent Application No. 18938915.8; Jun. 1, 2023.

* cited by examiner

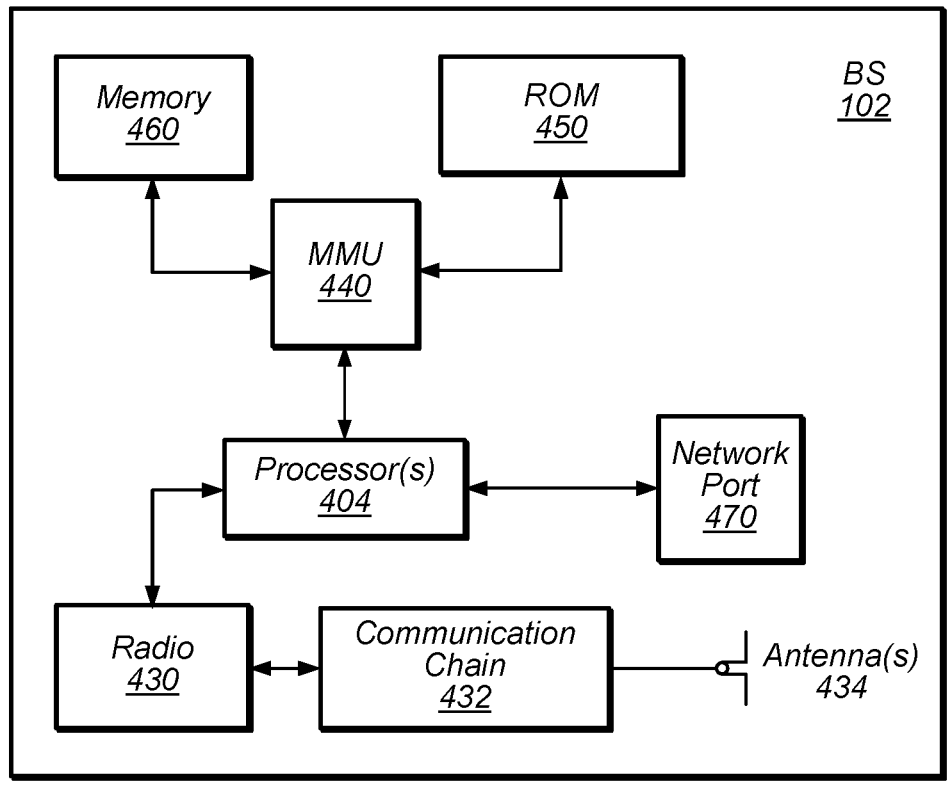
FIG. 4
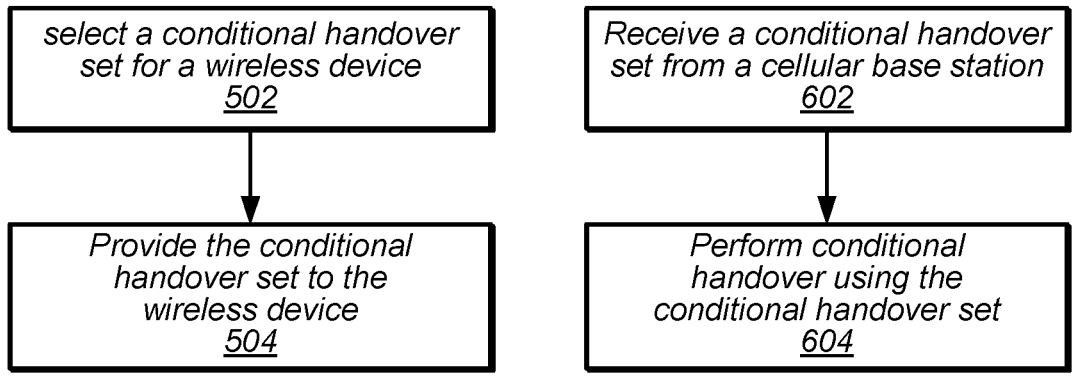
FIG. 5
FIG. 6

CONDITIONAL HANDOVERS AND CELL RE-SELECTIONS ALONG KNOWN ROUTES

PRIORITY CLAIM

This application is a national phase entry of PCT application number PCT/CN2018/113358, entitled "Conditional Handovers and Cell Re-Selections Along Known Routes," filed Nov. 1, 2018, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to systems, apparatuses, and methods for performing conditional handovers and cell re-selections along known routes.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), 5G NR, LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through wireless devices used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY OF THE INVENTION

Embodiments are presented herein of apparatuses, systems, and methods for performing conditional handovers and cell re-selections along known routes.

According to the techniques described herein, it may be possible for a cellular base station to configure a wireless device with information supporting potential early conditional handover to multiple cells. Such information may be selected or determined based on an expected or possible known route that the wireless device may travel along. For example, such information could be based on the location of the wireless device and common travel patterns from that location, such as from a train station, in which case common known travel routes could include travel along any train tracks leaving the train station. Additionally or alternatively, such information could be based on information provided by the wireless device itself, such as if an expected destination and route of the wireless device can be determined from a mapping application in active use, from user input, from historical device use patterns, etc.

Such techniques may help minimize handover signaling and improve handover reliability, particularly in high speed/high mobility scenarios in which in-time signaling may be vulnerable to rapidly changing channel conditions, and may help reduce data losses, gaps, and stalls that could be caused by such less reliable handover operations, at least according to some embodiments.

Similarly, it may be possible to provide a wireless device with cell re-selection assistance information facilitating cell re-selection along an expected or possible known route that the wireless device may travel along. Such information could be selected or determined in a similar manner as for route determination for supporting early conditional handover to a set of cells along an expected or possible known route, at least according to some embodiments.

Such techniques may help improve cellular service retention, again particularly in high speed/high mobility scenarios in which rapidly changing channel conditions can make cell re-selection more challenging, at least according to some embodiments. Such techniques may also result in wireless device power consumption savings, e.g., by potentially reducing the number of neighbor cells that need to be searched to find a suitable re-selection candidate, at least according to some embodiments. As another possibility, such techniques may enable the network to more actively manage its load balance, for example by guiding wireless devices to stay on certain cells preferred by the network, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 4 illustrates an exemplary block diagram of a base station, according to some embodiments;

FIGS. 5-6 are flowchart diagrams illustrating aspects of exemplary possible methods for performing conditional handovers and cell re-selections along known routes, according to some embodiments;

Figure 1:
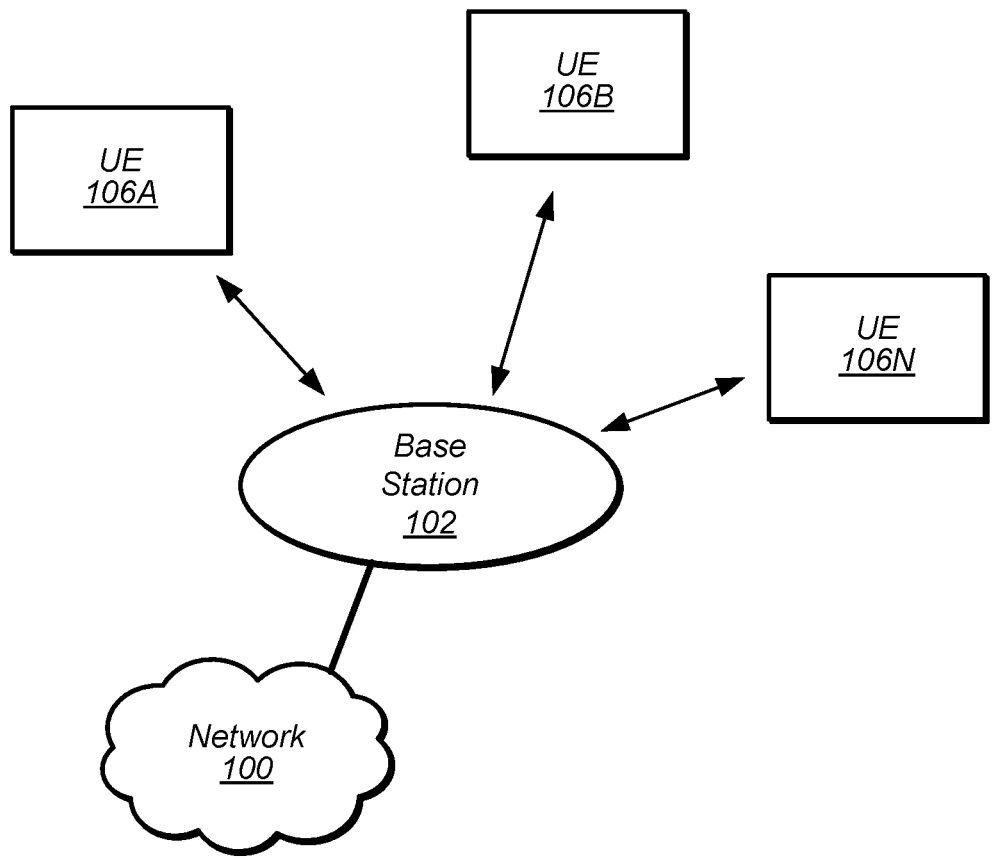
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
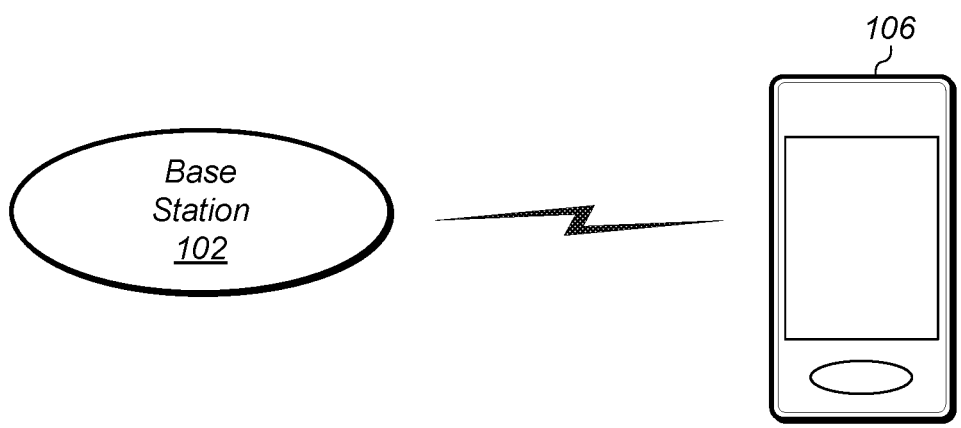
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform conditional handovers and cell re-selections along known routes, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
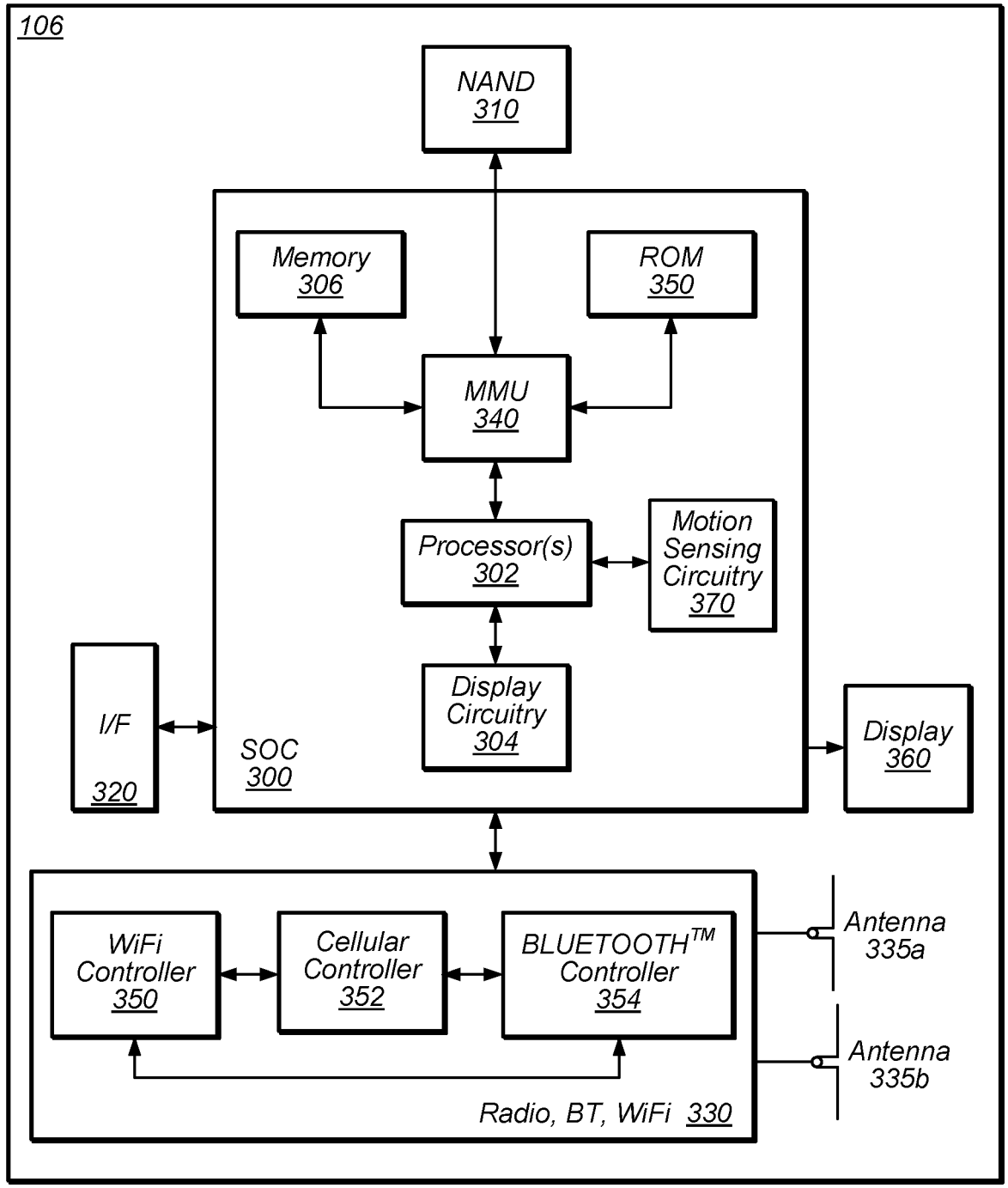
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform conditional handovers and cell re-selections along known routes. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform conditional handovers and cell re-selections along known routes according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 352 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 352 may include hardware and/or software components for generating Wi-Fi physical layer preamble signals, e.g., for transmitting as part of uplink communications by the UE 106 that occur in unlicensed frequency bands.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform conditional handovers and cell re-selections along known routes.

FIGS. 5-6—Conditional Handovers and Cell Re-Selections Along Known Routes

Wireless devices operating in radio resource control (RRC) connected mode may have their mobility operations managed by the cellular network with which they are registered, e.g., by way of handover operations. In some instances, such handovers can include a serving base station providing signaling to a wireless device configuring (e.g., periodically or in an event-based manner) the wireless device to perform measurements on neighbor cells, receiving signaling including measurement reports from the wireless device based on those measurements, and providing signaling to the wireless device configuring a handover to another cell if certain handover conditions are met.

Use of such in-time signaling between a network and a device to perform handover can allow for dynamic selection of the best cell to which to perform handover at the time that handover is needed, which may be important if there is no way to determine which cell will be the best handover candidate in advance. However, such in-time signaling can sometimes lead to handover failures, e.g., as configuring handover in-time may commonly occur in relatively weak channel/signal conditions, especially in fast moving conditions in which channel quality may degrade relatively quickly.

Accordingly, in such a scenario and/or in various other scenarios, early conditional handover may be used, e.g., to reduce RRC signaling, which may make the handover more reliable. Early conditional handover may include attempting to pre-deliver handover commands for a route in advance, e.g., while conditions are good (e.g., when the device is stationary and/or has good signal quality), and allowing the device to handover later, e.g., with a reduced signaling set. For example, if a wireless device may be travelling along a known route, the network may be aware of possible handover target cells along with the usual handover points (where devices usually handoff from one serving cell to the next target cell) along the known/fixed route in advance, and so may configure early conditional handover for one or more cells along the predicted route(s). Such techniques may help reduce data losses, gaps, and stalls, and may help reduce latency for wireless device handover from one cell to another. Accordingly, FIGS. 5-6 are flowchart diagrams illustrating methods for performing early conditional handovers and cell re-selections along known routes, according to some embodiments.

Aspects of the method of FIG. 5 may be implemented by a cellular base station (such as a BS 102 illustrated in and described with respect to various of the Figures herein), or more generally in conjunction with any of the computer systems or devices shown in the above Figures, among other devices, as desired. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the cellular base station may select a conditional handover set for a wireless device. The conditional handover set may include information for multiple conditional handovers. The conditional handover set may be ordered, e.g., including an in-order set of cells (e.g., identified by cell frequency (such as E-UTRA Absolute Radio Frequency Channel Number, in an LTE context), physical cell identifier, and global cell identifier), according to some embodiments.

The conditional handover set may also include threshold information indicating one or more threshold conditions to be met to perform each conditional handover indicated in the conditional handover set. The thresholds may include serving cell signal strength (e.g., RSRP) and/or signal quality (e.g., RSRQ) thresholds at which to handover over a triggering period, and possibly a hysteresis offset parameter between the serving cell and a target cell, as one possibility. Note that each conditional handover of the conditional handover set may have different threshold information (e.g., handover threshold(s) may be unique per cell), or some or all conditional handovers may have the same threshold information.

At least in some instances, a validity timer for the conditional handover set may also be selected. The validity timer may indicate a configured maximum amount of time between handovers associated with the conditional handover set, e.g., such that the conditional handover set may expire or become invalid if the validity timer runs for its full duration at a wireless device without the wireless device performing a handover in accordance with the conditional handover set, according to some embodiments.

The conditional handover set may be selected by the cellular base station for the wireless device based on any of a variety of possible considerations. As one possible consideration, the wireless device might be located in a location from which there may be a high probability of travelling along a known route. For example, the wireless device might be located in a train station, such that there may be a high likelihood of travel along the train tracks leading from the station in one direction or another. A motorway or autobahn could have similar characteristics, as another possible example. Additionally or alternatively, it may be possible to determine potential 'known routes' using machine learning to create probabilistic models for locations and common travel paths from those locations more generally, e.g., using mimization drive test (MDT) or self organizing network (SON) reports, or any of various other possible data sources. Typical characteristics of such travel along a known route (e.g., typical distance travelled on the train, typical train speeds, etc.) may further be considered, e.g., as determined based on previously gathered data, route analysis, and/or any of various other techniques, according to some embodiments.

As a still further possibility, in some instances, the cellular base station may receive assistance information from the wireless device, e.g., indicating a set of candidate cells for a conditional handover set or otherwise providing information that can be used by the network to select the conditional handover set for the wireless device. For example, the wireless device may be able to predict its possible travel route, e.g., based on directions to a current destination associated with a mapping application that is in active use by the wireless device, or based on pre-programming of a travel route of the wireless device (e.g., in the case of a wireless device embedded in a vehicle programmed to travel a particular route). As another possibility, the wireless device may be able to predict its possible travel route based on previous wireless device usage, e.g., if a user of the wireless device commonly follows a predictable travel route at certain times of day and/or week.

As still another possibility, in some instances, network load distribution could also inform the selection of the conditional handover set. For example, if one cell along a known or predicted route is heavily loaded, but another cell along the known or predicted route is lightly loaded and may be able to serve as a substitute, the more lightly loaded cell may be included in the conditional handover set instead of the more heavily loaded cell. Any of various other considerations are also possible. Thus, such information may inform the selection of which conditional handovers to include in the conditional handover set, how many conditional handovers to include in the conditional handover set, the threshold information for the conditional handover set, etc.

Further, in some instances, the cellular base station may select one or more additional conditional handover sets for the wireless device. For example, as previously noted, in some scenarios, there may be multiple possible known/predicted routes that may be travelled from a certain location, and the network may not be aware of in which direction the wireless device will travel. In such a case, it may be beneficial to provide the wireless device with multiple conditional handover sets, e.g., with each associated with a possible known/predicted route from the current location of the wireless device.

At least according to some embodiments, the cellular base station may provide an early handover request to a target cell of an initial conditional handover of the conditional handover set. If multiple conditional handover sets are provided, such a request may be provided to each such potential initial target cell. If the early handover request(s) is (are) accepted (e.g., in which case a handover acknowledgement may be received from the target cell by the cellular base station), in 504, the cellular base station may provide the conditional handover set(s) to the wireless device. At least according to some embodiments, data for the wireless device may be provided to the current serving cell of the wireless device and also to any potential handover target cells of the wireless device once an early handover request is accepted by such a potential handover target cell. This may help reduce any possible data losses/gaps/stalls that the wireless device might otherwise experience during handover, albeit at a possible cost of additional network resource use.

The conditional handover set(s) may be provided in any of various ways. At least according to some embodiments, a conditional handover set may be provided using RRC signaling while the wireless device is in RRC connected mode. As one possibility, a conditional handover set may be included in a mobilityControlInfo information element (IE) in a RRC reconfiguration message. As another possibility, a conditional handover set may be included in a measObject IE in a RRC reconfiguration message. As a still further possibility, a portion of a conditional handover set may be provided in each of the mobilityControlInfo IE and the measObject IE. For example, a list of cell identification tuples (e.g., cell frequency, physical cell ID, global cell ID) for the conditional handover set could be provided in the mobilityControlInfo IE, and handover threshold information for the conditional handover set could be provided in the measObject IE, as one option. Any number of other signaling configurations for providing conditional handover sets may additionally or alternatively be used.

Additionally, it may be possible for the cellular base station (e.g., or another cellular base station to which the wireless device has performed handover) to modify or cancel the conditional handover set(s) provided to a wireless device. For example, when providing a conditional handover set, one possible parameter could include a number of conditional handover sets being provided. Such signaling could also be used to indicate that 0 conditional handover sets are being provided, e.g., to indicate to cancel any currently configured conditional handover sets. Similarly, the cellular base station could provide one or more conditional handover sets to a wireless device when one or more conditional handover sets are already configured for the wireless device, in which case the more recent conditional handover set(s) may be considered to override any existing conditional handover sets, such that the old conditional handover set(s) may be canceled/discarded.

Once a conditional handover set (or sets) is (are) provided to the wireless device, the wireless device may perform conditional handover using the conditional handover set(s), e.g., such as illustrated in FIG. 6 and described herein with respect thereto. Aspects of the method of FIG. 6 may be implemented by a wireless device (such as a UE 106 illustrated in and described with respect to various of the Figures herein), or more generally in conjunction with any of the computer systems or devices shown in the above Figures, among other devices, as desired. Note that while at least some elements of the method of FIG. 6 are described in a manner relating to the use of communication techniques and/or features associated with LTE, NR, and/or 3GPP specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

In 602, the wireless device may receive a conditional handover set from a cellular base station. The conditional handover set may include information supporting multiple ordered early conditional handovers. For example, as similarly described with respect to FIG. 5, the conditional handover set may include cell frequency and cell identification information for each of multiple cells, and may indicate a specified order in which early conditional handover to those cells can be performed according to the conditional handover set, and threshold information indicating certain threshold conditions to be met to perform each of the indicated early conditional handovers. For example, the conditional handover set may indicate one or more of: a serving cell signal strength threshold to trigger handover to a cell indicated in the in-order conditional handover set if met for at least a triggering period; a serving cell signal quality threshold to trigger handover to a cell indicated in the in-order conditional handover set if met for at least the triggering period; a hysteresis offset parameter between a serving cell a handover target cell to be met to perform conditional handover to a cell indicated in the in-order conditional handover set; or a validity timer indicating a maximum amount of time between handovers for the in-order conditional handover set. Other threshold conditions are also possible.

In 604, the wireless device may perform conditional handover using the conditional handover set. For example, if the threshold conditions for at least the first conditional handover indicated in the conditional handover set are met, the wireless device may perform conditional handover to at least a first cell indicated in the conditional handover set, e.g., based at least in part on the conditional handover set. In this case, the wireless device may transmit a handover confirmation to the first cell (i.e., the cell to which handover is being performed). Note that it may be the case that performing the conditional handover may not require or include any additional signaling between the wireless device and the previous serving cell (i.e., the cell from which handover is being performed) after the threshold conditions for the conditional handover are met, at least in some instances. This may help reduce the likelihood of handover failure, e.g., since at that point the previous serving cell may have become relatively weak and the chance of such signaling being unsuccessful may correspondingly be relatively high.

Similarly, if the threshold conditions for at least a second conditional handover indicated in the conditional handover set are met, the wireless device may further perform conditional handover to at least a second cell indicated in the conditional handover set, e.g., after further travel along the known route for which the conditional handover set is selected. Such conditional handovers in accordance with the conditional handover set may continue to be performed if conditions for them are met until the conditional handover set has been completed (e.g., there are no further conditional handovers indicated by the conditional handover set), or alternatively until one or more other events triggering cancellation or modification of the conditional handover set occur.

There may be any number of reasons/causes for a conditional handover set to be discarded/cancelled prior to exhaustion of the conditional handover set. As one possibility, as previously noted, a serving cell of the wireless device may provide an indication to cancel a conditional handover set. Similarly, a serving cell of the wireless device may provide one or more updated conditional handover sets to the wireless device, which may supersede and thus cancel any conditional handover sets that were previously provided to the wireless device. As another possibility, a serving cell of the wireless device might configure a handover of the wireless device to a cell that is not part of the conditional handover set currently configured at the wireless device, or possibly even to a cell that is part of the conditional handover set currently configured at the wireless device but is not next in order in the conditional handover set, for example if the wireless device leaves the known route (e.g., due to taking an exit from a motorway, debarking from a train, etc.). In such a case, the wireless device may also discard the conditional handover set. As still another possibility, if a validity timer is configured for the conditional handover set, and the wireless device does not perform the next indicated conditional handover of the conditional handover set prior to expiration of the validity timer, the wireless device may discard the conditional handover set.

At least according to some embodiments, a conditional handover set may be associated with a single RRC connection. Thus, as another possibility, if the RRC connection of the wireless device is released, the wireless device may discard the conditional handover set. Similarly, if the wireless device detects radio link failure, and is unable to recover from the radio link failure on the same cell on which the radio link failure occurs, the wireless device may discard the conditional handover set.

In some instances (e.g., as also discussed with respect to FIG. 5), the wireless device may receive multiple conditional handover sets. At least in some scenarios, such multiple conditional handover sets may include different sets of cells, e.g., to account for the possibility of different directions of travel along known routes from a given location. In such a case, once an early conditional handover is performed according to one such conditional handover set that differs from another conditional handover set, any such differing conditional handover set(s) may be discarded by the wireless device. Note, though, that it may also be possible to retain multiple conditional handover sets that include partially overlapping known routes, e.g., for as long as the wireless device performs conditional handovers along the overlapping portion of the multiple conditional handover sets.

In some instances (e.g., as also discussed with respect to FIG. 5), the wireless device may provide assistance information to the network to facilitate selection by the network of one or more conditional handover sets for the wireless device. For example, the wireless device could determine an ordered set of candidate cells for an in-order conditional handover set, and transmit an indication of the ordered set of candidate cells to its serving cellular base station. The wireless device could determine the candidate cells in any of various ways. Some possibilities could include using a route to a destination associated with a mapping application in use at the wireless device, a pre-programmed travel route of the wireless device, or a predicted travel route of the wireless device based at least in part on previous wireless device use. Other techniques for determining a set of candidate cells for a conditional handover set are also possible.

Note that in addition or as an alternative to providing conditional handover sets to support early conditional handovers along known routes, e.g., while in RRC connected mode, it may also be useful to apply knowledge of potential known travel routes to facilitate more effective and/or more power efficient cell selection and re-selection, e.g., while in RRC inactive or idle mode.

For example, it may be the case that a cellular base station could provide cell re-selection assistance information for a wireless device, e.g., including (e.g., mandatory) system information for multiple cells along a possible known/expected travel route for the wireless device. Such information could be broadcast (e.g., by one or more serving cells or other broadcast points in the vicinity of a common fixed travel route such as a train route), or could be specifically selected for and unicast to a wireless device (e.g., in an unsolicited manner or at the request of the wireless device, for example based on a set of cells selected and suggested by the wireless device), e.g., using RRC configuration information while the wireless device is in RRC connected mode, or using a RRC connection release message upon RRC connection release. Any of various other ways of providing such information are also possible.

The cell re-selection assistance information may include complete mandatory system information for at least one of the cells, and delta information indicating differences from the complete mandatory system information for any cells for which the mandatory system information differs from the complete mandatory system information, as one possibility, e.g., to reduce the payload of the cell re-selection assistance information compared to providing complete mandatory system information for each of the cells included in the cell re-selection assistance information. In some instances, the cell re-selection assistance information may include a refresh timer length, e.g., indicating a validity period for at least a portion of the cell re-selection assistance information. Numerous other cell re-selection assistance information parameters and formats are also possible.

The wireless device may use such cell re-selection assistance information when performing cell re-selection. For example, the wireless device may perform cell re-selection to a cell for which system information is available from the cell re-selection assistance information. In some instances, cells indicated in the cell re-selection assistance information may be prioritized when performing cell re-selection, e.g., by applying an offset to their cell ranking, preferentially performing cell measurements on such cells, and/or in any of various other possible ways.

Note that while the methods of FIGS. 5-6 can be performed in conjunction with each other (e.g., by a wireless device and a cellular base station in communication with each other), part or all of the methods of FIGS. 5-6 may alternatively be used independently of one another, as desired.

FIGS. 7-14 and Additional Information

FIGS. 7-14 and the following information are provided as being illustrative of further considerations and possible implementation details relating to the methods of FIGS. 5-6, and are not intended to be limiting to the disclosure as a whole. Numerous variations and alternatives to the details provided herein below are possible and should be considered within the scope of the disclosure.

Figure 7:
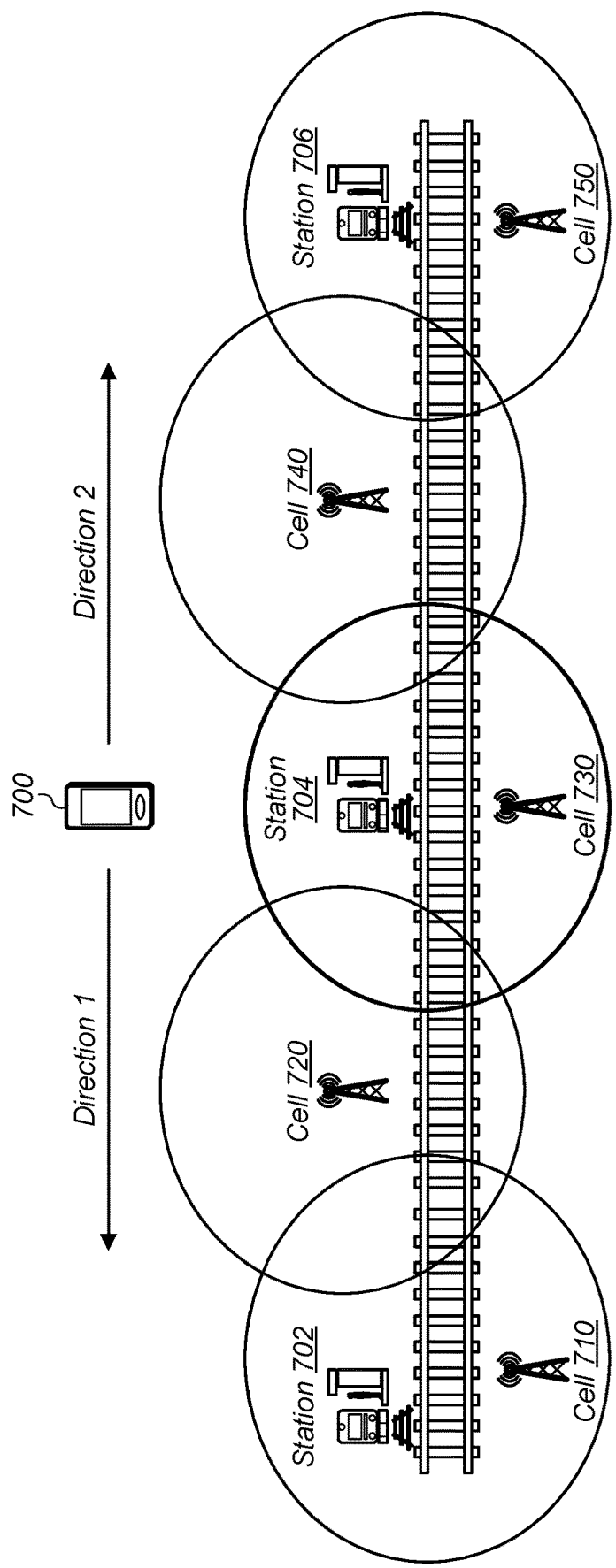
FIG. 7 illustrates an exemplary scenario in which a wireless device may travel along a known route, according to some embodiments.

FIG. 7 illustrates one possible scenario in which fast moving conditions may be expected, and further in which a network may be able to determine that a wireless device may travel along a known/fixed route. In the illustrated scenario, a wireless device 700 may be at a station 704, within a cell 730. Given the train route, two likely paths for the wireless device 700 may be towards station 702 (e.g., via cell 720 and cell 710) or towards station 706 (e.g., via cell 740 and cell 750).

In such a scenario, it may be the case that channel conditions from the source cell deteriorate very quickly, e.g., due to the high speed mobility, which may in turn lead to an increased probability of in-time handover command signaling not succeeding. If measurements are configured (e.g., even for conditional handover), there could be potential for a large group of devices (e.g., those of the passengers of the train) that evaluate similar channel conditions and enter the reporting point near-simultaneously, which may in turn potentially cause a spike in network load. Further, if measurements are missed, this could lead to conditional handover failures, and the network may not be able to forward data for a wireless device to the target cell of the wireless device.

Accordingly, in such a scenario and/or in various other scenarios, early conditional handover may be used, e.g., to reduce RRC signaling, which may make the handover more reliable. As previously noted, early conditional handover may include attempting to pre-deliver handover commands for a route in advance, e.g., while conditions are good (e.g., when the device is stationary and/or has good signal quality), and allowing the device to handover later, e.g., with a reduced signaling set. For example, if a wireless device may be travelling along a known route such as in the illustrated scenario of FIG. 7, the network may be pre-aware of possible handover target cells along with the usual handover points (where devices usually handoff from one serving cell to the next target cell) along the known/fixed route, and so may configure early conditional handover for one or more cells along the predicted route(s). Such techniques may help reduce data losses, gaps, and stalls, and may help reduce latency for wireless device handover from one cell to another.

Note that while train routes (e.g., whether high speed and otherwise) may represent one possible scenario in which a network may be aware of a possible or probably known route along which a wireless device may travel, numerous other scenarios in which a network may be aware of a possible or probable known route along which a wireless device may travel may also be possible. For example, wireless devices traveling along certain motorways or autobahns may have the potential to travel along known/fixed routes, in some instances. As another possibility, machine learning (e.g., using minimization of drive test (MDT) or self organizing network (SON) reports from devices, and/or any of various other possible data sources) may be used to create probabilistic models to determine potential routes of devices from certain locations, possibly associated with certain times of day and/or other considerations.

For a network to configure in-order early conditional handover sets for wireless devices, certain information may be provided from the network to a wireless device. Among such possible information may be a number of in-order conditional handover sets (e.g., ranging from 0 up to any desired maximum value), e.g., to account for the possibility that there could be multiple routes possible from a given location. For example, in the illustrated scenario of FIG. 7, an in-order early conditional handover set including cell 720 and cell 710 as well as an in-order early conditional handover set including cell 740 and cell 750 could be provided to a wireless device located at station 704 and served by cell 730.

For each in-order early conditional handover set, a list of tuples including cell frequency and cell identifier information (e.g., EARFCN, PCI, global cell ID, for LTE cells, as one possibility) for the cells included in the in-order early conditional handover set. Additionally, handover threshold information may be provided, including serving cell thresholds ("Thresh1") for signal strength and/or signal quality (e.g., RSRP, RSRQ) at which to handover over a triggering period ("Time1"). If desired, a hysteresis offset parameter indicating a minimum signal strength and/or quality difference between the serving cell and the next target cell may also be included. Alternatively, such a parameter may not be included, and blind handover to the target cell may be attempted if the serving cell threshold is met. The handover threshold(s) may be unique for each cell, or common for certain groups of cells, or common for all cells. Further, a validity timer ("V") may be indicated for an in-order early conditional handover set, e.g., such that time between handovers cannot exceed V, or the conditional handover set may be invalidated and the wireless device may discard the entire configuration.

The network may be able to send one or more in-order early conditional handover sets in to a wireless device in any of various ways. As one possibility, part or all of the information for in-order early conditional handover sets can be provided via mobilityControlInfo in a RRC Reconfiguration message in RRC connected state. As another possibility, part or all of the information for in-order early conditional handover sets can be provided via measObject in a RRC Reconfiguration message in RRC connected state. Other signaling frameworks for indicating portions of or the entirety of one or more in-order early conditional handover sets are also possible.

Further, the network may be able to cancel an in-order early conditional handover set, if there is need/desire to do so, for example by sending an update (e.g., as part of mobilityControlInfo or via any other configured signaling) indicating that the number of in-order early conditional handover sets configured for a wireless device is equal to 0. The network may also be able to update the in-order early conditional handover set(s) configured at a wireless device, e.g., by sending one or more updated in-order early conditional handover sets. Such an update may completely override any previous conditional handover set(s), and the validity timer at the wireless device may be re-started on receipt of the new message.

According to some embodiments, in-order early conditional handover sets configured by the network may persist across a single RRC connection. Thus, in the event of RRC connection release or other transition to RRC idle/inactive state, the validity timer may be cancelled and all configured in-order early conditional handover sets may be discarded by the wireless device. Similarly, in the event of radio link failure that is not recovered on the same cell, the validity timer may be cancelled and all configured in-order early conditional handover sets may be discarded by the wireless device. Further, in the event of successfully executing the last handover specified in an in-order early conditional handover set, the validity timer may likewise be cancelled and all configured in-order early conditional handover sets may be discarded by the wireless device.

In some instances, a wireless device may leave (or not even initially follow) a known route for which an in-order early conditional handover set has been configured. To account for such a possibility, networks could additionally configure a wireless device with additional measurement objects, and the wireless device could provide measurement reports using parameters set in the measurement configuration, via the RRC reconfiguration message. The wireless device could also be configured to report detected cells to the network. Detected cells (e.g., according to 5G NR, at least according to some embodiments) may include cells that are not listed within the configured measurement object(s) but are detected by the wireless device on the carrier frequency or frequencies indicated by the configured measurement object(s). The wireless device could optionally be configured with an offset for measurement quantities and/or the time to trigger for these additional cells if in-order early conditional handover set(s) are configured previously, and/or offsets could be applied to cells in the in-order early conditional handover set(s), e.g., to prioritize cells on the fixed/known route(s) over these additional cells. If the wireless device reports to the network these additional cells that are not part of the in-order early conditional handover set(s) configured by the network, the network may choose (e.g., based on its own internal implementation, and considering any of various possible factors) to handover the RRC connection to one of these additional cells. In such a case, if the wireless device is handed over by the network to a cell that is not part of any of the configured conditional handover sets of the wireless device, the device may be assumed to be no longer on a fixed/known route. In this case, the validity timer may be cancelled and all configured in-order early conditional handover sets may be discarded by the wireless device.

For early conditional handover, it may be the case that the network prepares and forwards user plane data for a UE to the current serving cell of the UE and to the target of the potential early conditional handover, e.g., to allow for the conditional handover to be executed with a minimal gap in data services for the UE. Hence if there are multiple in-order conditional handover sets, it may possibly be a concern that the network would have to forward data to multiple cells simultaneously, which may represent a drain on network resources.

It may be possible, however, to alleviate such a concern, at least to some degree. For example, consider a scenario in which two distinct in-order conditional handover sets are configured while a UE is currently served by 'cell 1': 'cell 1' to 'cell 2' to 'cell 3' to 'cell 4', and 'cell 1' to 'cell 5' to 'cell 6' to 'cell 7'. Initially, the network may forward data to cell 2 and cell 5 along with cell 1. However, once the UE sends a handover confirmation to cell 2, the network would then cease forwarding data to cell 1 and cell 5, and start forwarding data to cell 3. Similarly, for the rest of the UE's progress through the in-order conditional handover set, the network may not need to forward data to more than two cells at any given time. Hence, in most instances, the network resource drain when providing multiple in-order conditional handover sets may be no greater than when one conditional handover command is provided at a time.

Further, it may be possible for a network to delay forwarding data to one or more early conditional handover target cells for some amount of time to further limit the network resource use impact of early conditional handovers, e.g., as desired. For example, the network might delay data forwarding until one or more configured triggers (e.g., that may be indicative that a UE is about to handover to the next target cell on a route) are detected, which may be based on one or more of: RRC signaling measurement report A2, if configured, on the current serving cell; L1 timing advance information; doppler and angle of arrival associated with the UE; L1 CQI/CSI-RS measurements and other channel feedback; and/or any of various other possible considerations.

FIGS. 8-14 are message sequence charts illustrating possible signal flow in a variety of scenarios in which in-order early conditional handover sets are used.

Figure 8:
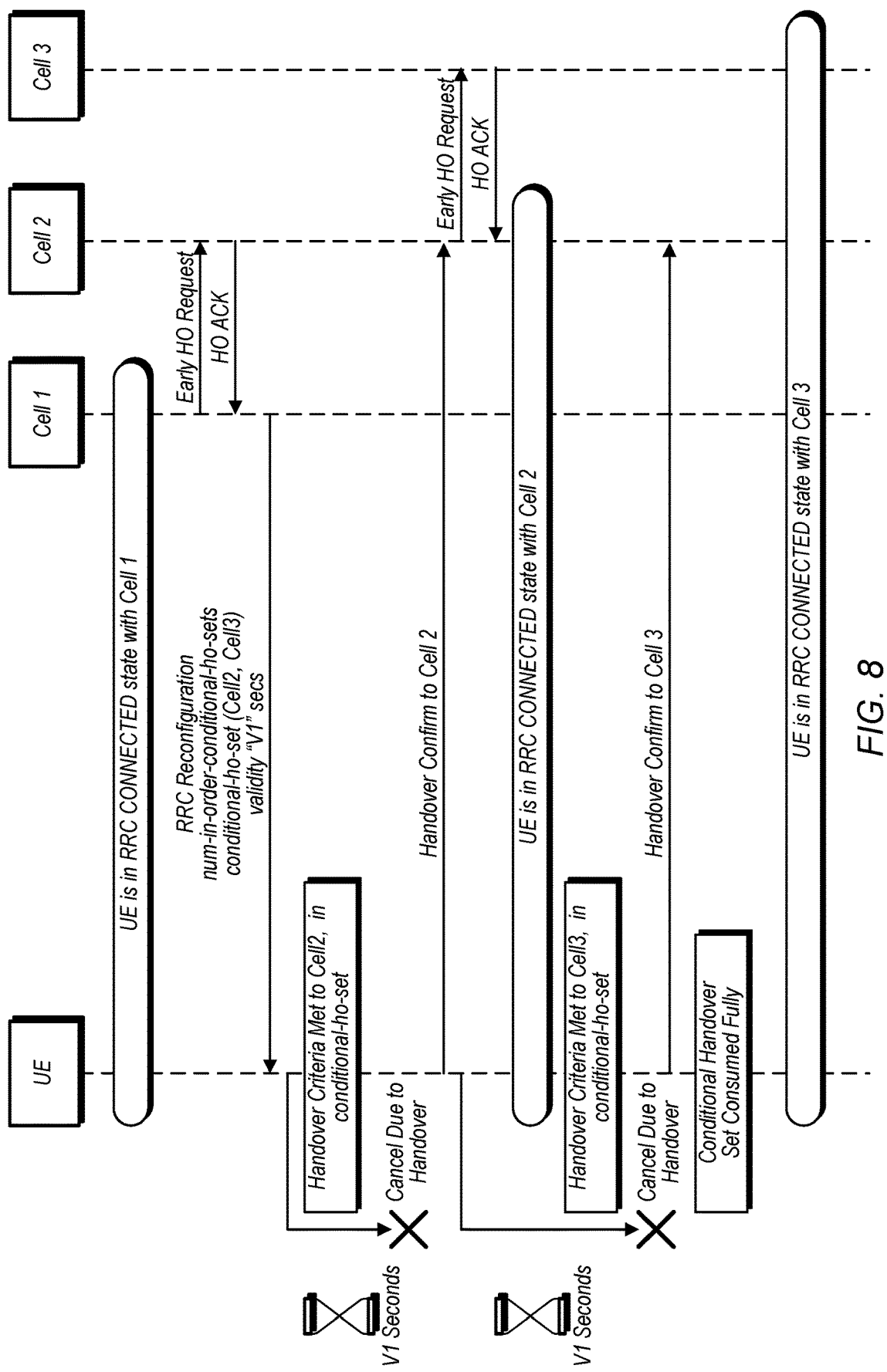
FIG. 8 is a message sequence chart illustrating possible signal flow in an exemplary scenario in which a conditional handover set is fully consumed by a wireless device, according to some embodiments.

FIG. 8 is a message sequence chart illustrating possible signal flow in an exemplary scenario in which a conditional handover set is fully consumed by a UE, according to some embodiments. As shown, in the illustrated scenario, the UE may initially be in RRC connected state with a first cell. The first cell may select an in-order early conditional handover set for the UE, e.g., that includes a second cell and a third cell. The first cell may provide an early handover request to the second cell (e.g., the first handover target of the in-order early conditional handover set), which the second cell may accept and accordingly provide a handover acknowledgement (ACK). The first cell may provide the in-order early conditional handover set to the UE.

The UE may initiate a validity timer having a length indicated for the in-order early conditional handover set. Prior to expiration of the validity timer, handover criteria for the conditional handover to the second cell may be met, and the UE may handover to the second cell, including providing a handover confirmation to the second cell. The UE may re-start the validity timer after the successful handover. At this point, the UE may be in RRC connected state with the second cell.

The second cell may provide an early handover request to the third cell (e.g., the next handover target of the in-order early conditional handover set), which the third cell may accept and accordingly provide a handover ACK. At some point prior to expiration of the validity timer, handover criteria for the conditional handover to the third cell may be met, and the UE may handover to the third cell, including providing a handover confirmation to the third cell. At this point, the UE may be in RRC connected state with the third cell. The UE may at this point cancel the validity timer and discard the in-order early conditional handover set, e.g., since it may have fully consumed the in-order early conditional handover set.

Figure 9:
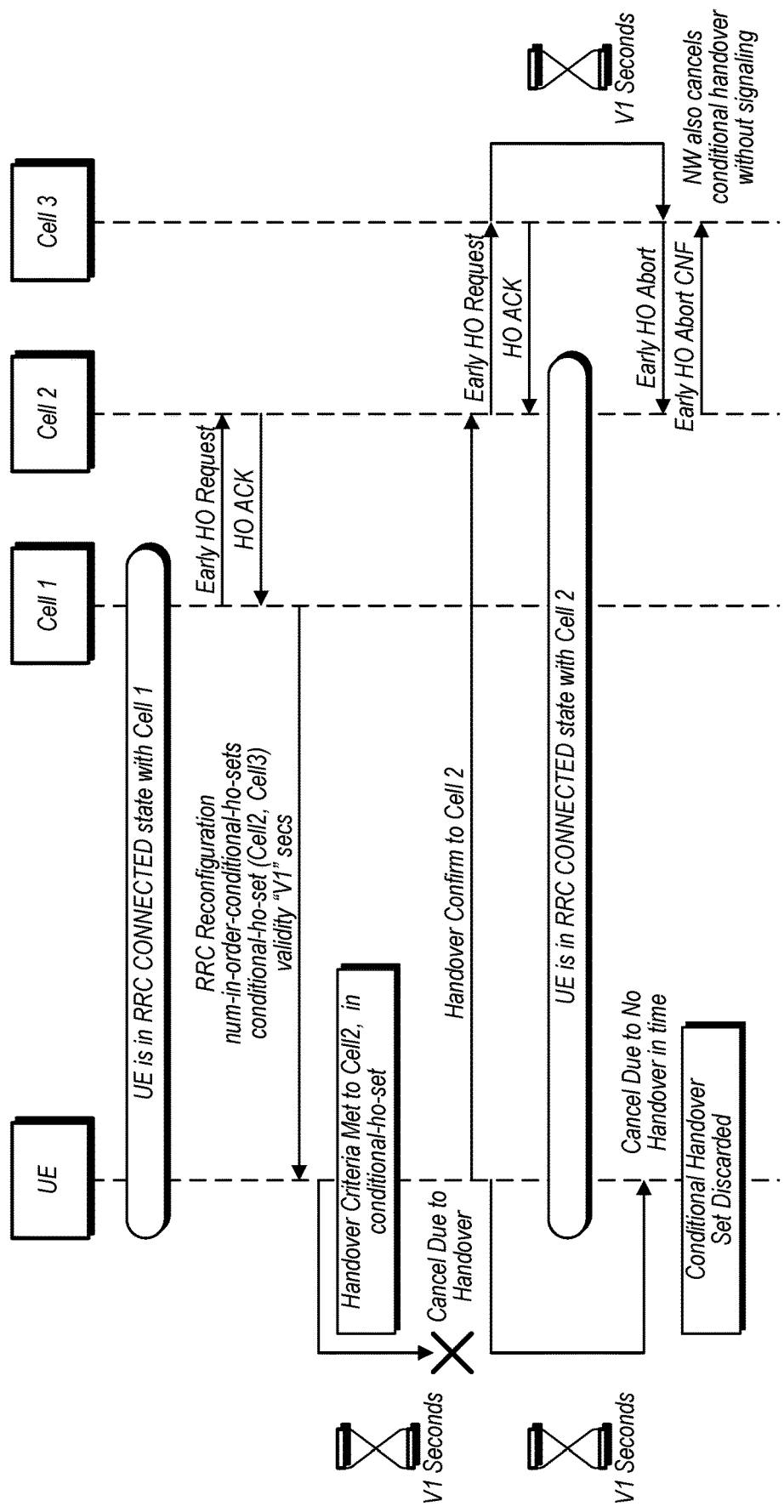
FIG. 9 is a message sequence chart illustrating possible signal flow in an exemplary scenario in which a conditional handover set is partially consumed by a wireless device then cancelled due to validity timer expiration, according to some embodiments.

FIG. 9 is a message sequence chart illustrating possible signal flow in an exemplary scenario in which a conditional handover set is partially consumed by a wireless device then cancelled due to validity timer expiration, according to some embodiments. As shown, in the illustrated scenario, the UE may initially be in RRC connected state with a first cell. The first cell may select an in-order early conditional handover set for the UE, e.g., that includes a second cell and a third cell. The first cell may provide an early handover request to the second cell (e.g., the first handover target of the in-order early conditional handover set), which the second cell may accept and accordingly provide a handover acknowledgement (ACK). The first cell may provide the in-order early conditional handover set to the UE.

The UE may initiate a validity timer having a length indicated for the in-order early conditional handover set. Prior to expiration of the validity timer, handover criteria for the conditional handover to the second cell may be met, and the UE may handover to the second cell, including providing a handover confirmation to the second cell. The UE may re-start the validity timer after the successful handover. At this point, the UE may be in RRC connected state with the second cell.

The second cell may provide an early handover request to the third cell (e.g., the next handover target of the in-order early conditional handover set), which the third cell may accept and accordingly provide a handover ACK. However, handover criteria for the conditional handover to the third cell may not be met prior to expiration of the validity timer, so the UE may cancel the validity timer and discard the in-order early conditional handover set. Additionally, the third cell may separately run a validity timer for the early conditional handover, and at its expiration, the third cell may indicate that the early handover is aborted, which the second cell may confirm back to the third cell. Thus, the UE and the network may be able to cancel the conditional handover without additional signaling between the UE and the network.

Figure 10:
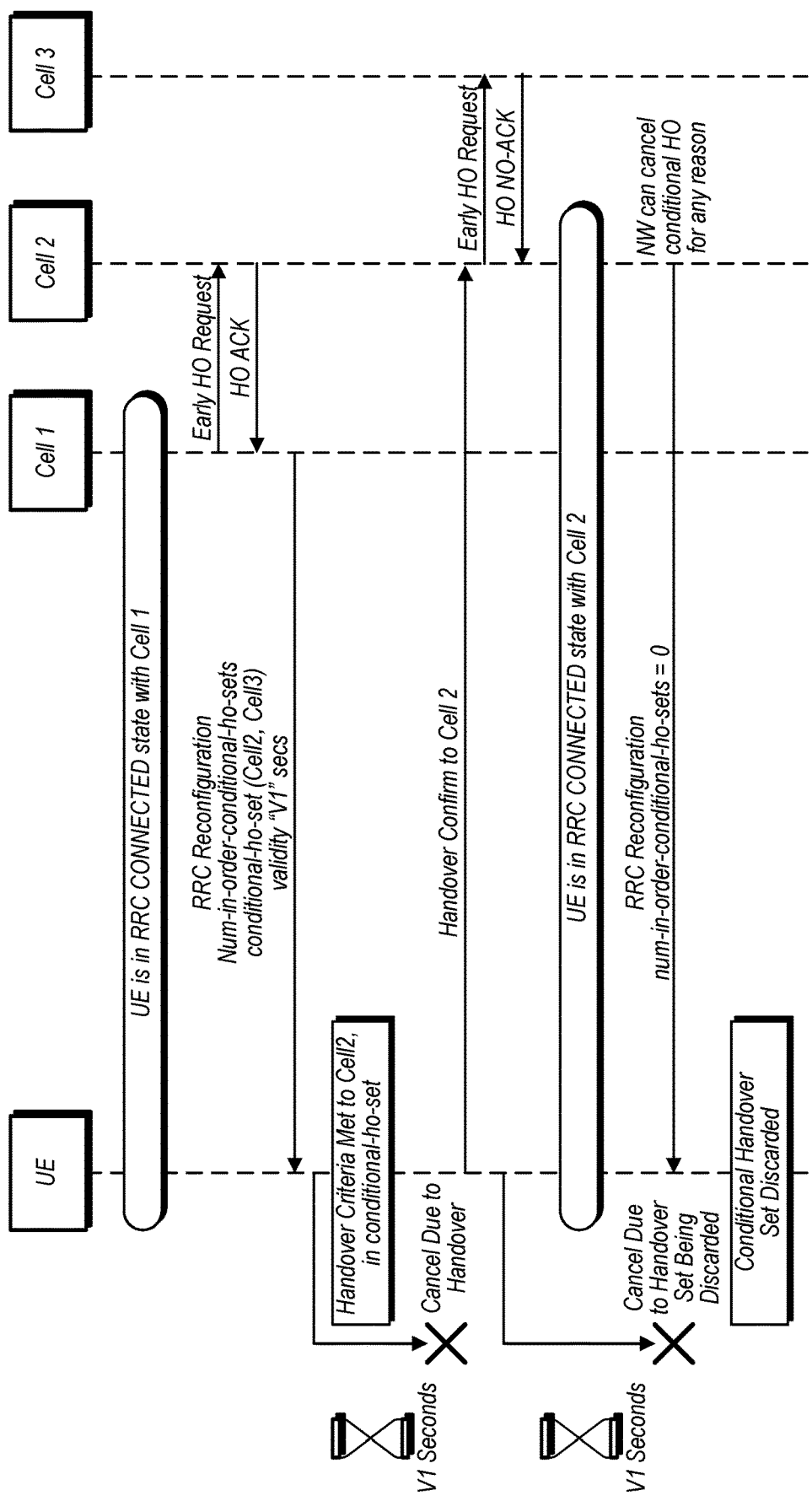
FIG. 10 is a message sequence chart illustrating possible signal flow in an exemplary scenario in which a conditional handover set is partially consumed by a wireless device then cancelled by the network, according to some embodiments.

FIG. 10 is a message sequence chart illustrating possible signal flow in an exemplary scenario in which a conditional handover set is partially consumed by a wireless device then cancelled by the network, according to some embodiments. As shown, in the illustrated scenario, the UE may initially be in RRC connected state with a first cell. The first cell may select an in-order early conditional handover set for the UE, e.g., that includes a second cell and a third cell. The first cell may provide an early handover request to the second cell (e.g., the first handover target of the in-order early conditional handover set), which the second cell may accept and accordingly provide a handover acknowledgement (ACK). The first cell may provide the in-order early conditional handover set to the UE.

The UE may initiate a validity timer having a length indicated for the in-order early conditional handover set. Prior to expiration of the validity timer, handover criteria for the conditional handover to the second cell may be met, and the UE may handover to the second cell, including providing a handover confirmation to the second cell. The UE may re-start the validity timer after the successful handover. At this point, the UE may be in RRC connected state with the second cell.

The second cell may provide an early handover request to the third cell (e.g., the next handover target of the in-order early conditional handover set), which the third cell may reject (which it may do for any reason) and accordingly provide a handover NO-ACK. The second cell may provide a RRC Reconfiguration message to the UE to indicate that the in-order early conditional handover set is cancelled, and the UE may accordingly cancel the validity timer and discard the in-order early conditional handover set.

Figure 11:
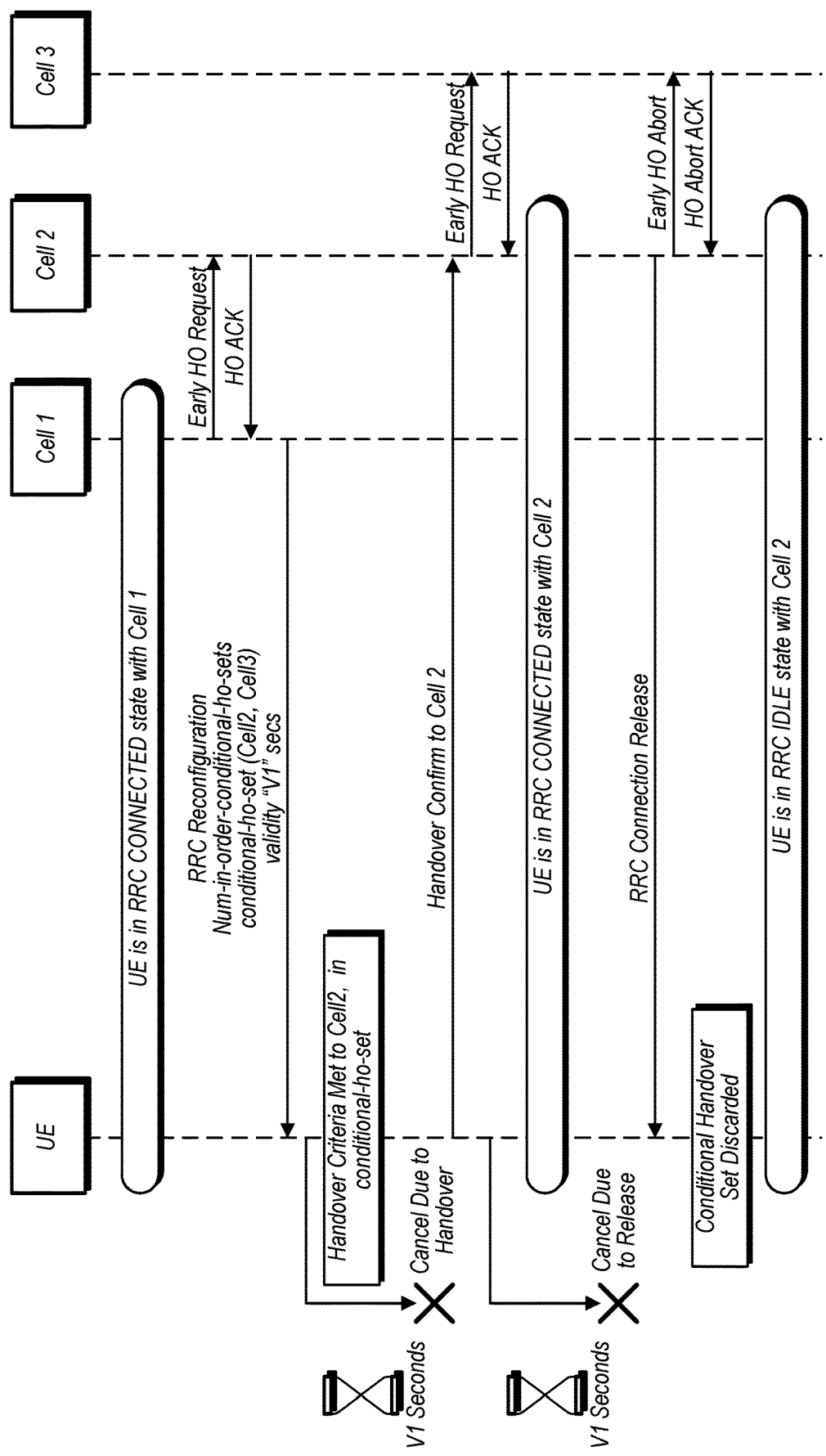
FIG. 11 is a message sequence chart illustrating possible signal flow in an exemplary scenario in which a conditional handover set is partially consumed by a wireless device then cancelled due to radio resource control connection release, according to some embodiments.

FIG. 11 is a message sequence chart illustrating possible signal flow in an exemplary scenario in which a conditional handover set is partially consumed by a wireless device then cancelled due to radio resource control connection release, according to some embodiments. As shown, in the illustrated scenario, the UE may initially be in RRC connected state with a first cell. The first cell may select an in-order early conditional handover set for the UE, e.g., that includes a second cell and a third cell. The first cell may provide an early handover request to the second cell (e.g., the first handover target of the in-order early conditional handover set), which the second cell may accept and accordingly provide a handover acknowledgement (ACK). The first cell may provide the in-order early conditional handover set to the UE.

The UE may initiate a validity timer having a length indicated for the in-order early conditional handover set. Prior to expiration of the validity timer, handover criteria for the conditional handover to the second cell may be met, and the UE may handover to the second cell, including providing a handover confirmation to the second cell. The UE may re-start the validity timer after the successful handover. At this point, the UE may be in RRC connected state with the second cell.

The second cell may provide an early handover request to the third cell (e.g., the next handover target of the in-order early conditional handover set), which the third cell may accept and accordingly provide a handover ACK. However, prior to handover criteria for the conditional handover to the third cell being met, the second cell may release the RRC connection for the UE (e.g., due to completion of a data session between the UE and the network), based on which the UE may cancel the validity timer and discard the in-order early conditional handover set. Additionally, the second cell may inform the third cell that the early conditional handover is aborted, which the third cell may confirm back to the second cell. At this point, the UE may be in RRC idle state with the second cell.

Figure 12:
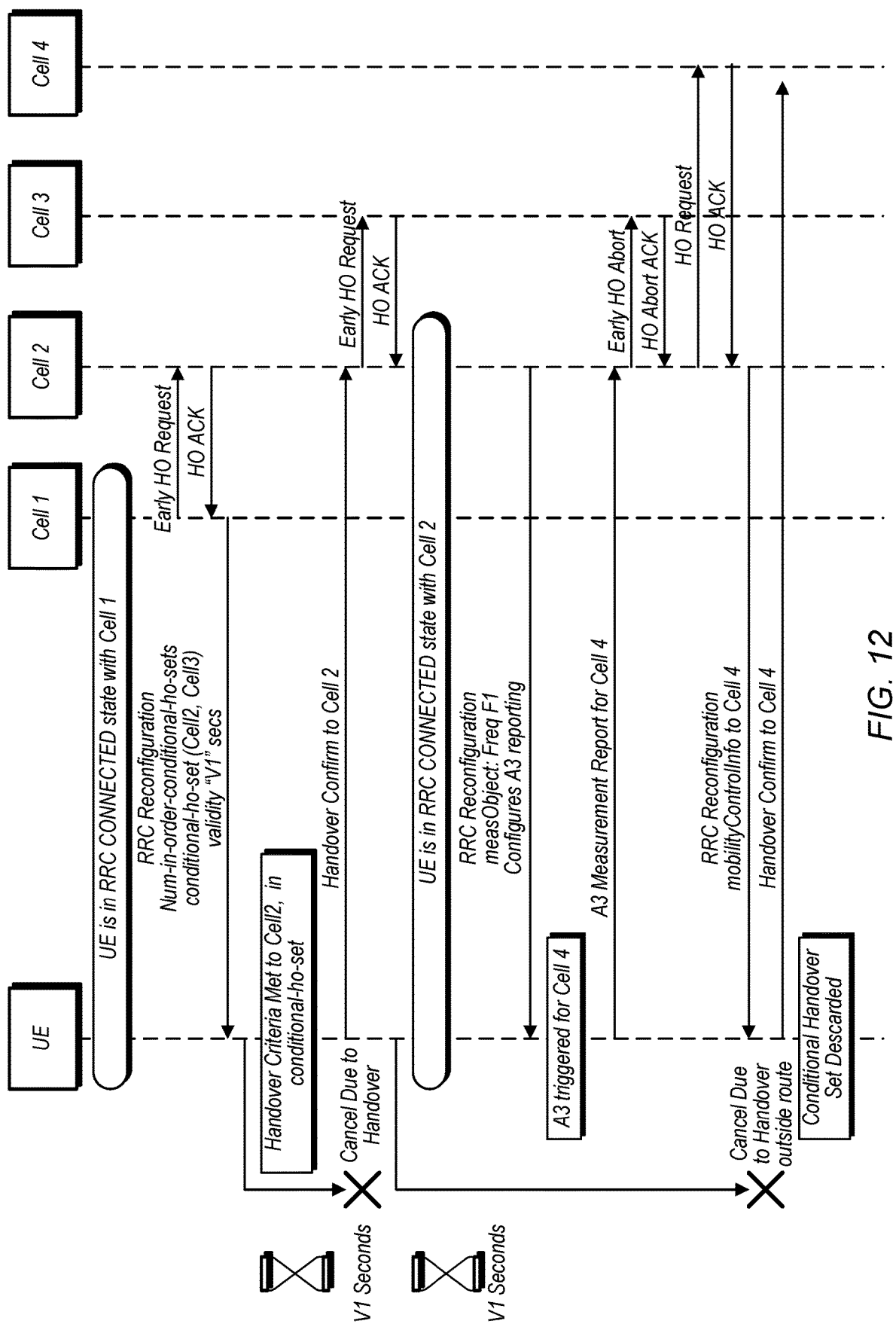
FIG. 12 is a message sequence chart illustrating possible signal flow in an exemplary scenario in which a conditional handover set is partially consumed by a wireless device then cancelled due to handover to a cell that is not in the conditional handover set, according to some embodiments.

FIG. 12 is a message sequence chart illustrating possible signal flow in an exemplary scenario in which a conditional handover set is partially consumed by a wireless device then cancelled due to handover to a cell that is not in the conditional handover set, according to some embodiments. As shown, in the illustrated scenario, the UE may initially be in RRC connected state with a first cell. The first cell may select an in-order early conditional handover set for the UE, e.g., that includes a second cell and a third cell. The first cell may provide an early handover request to the second cell (e.g., the first handover target of the in-order early conditional handover set), which the second cell may accept and accordingly provide a handover acknowledgement (ACK). The first cell may provide the in-order early conditional handover set to the UE.

The UE may initiate a validity timer having a length indicated for the in-order early conditional handover set. Prior to expiration of the validity timer, handover criteria for the conditional handover to the second cell may be met, and the UE may handover to the second cell, including providing a handover confirmation to the second cell. The UE may re-start the validity timer after the successful handover. At this point, the UE may be in RRC connected state with the second cell.

The second cell may provide an early handover request to the third cell (e.g., the next handover target of the in-order early conditional handover set), which the third cell may accept and accordingly provide a handover ACK. However, the second cell may provide a RRC Reconfiguration message configuring A3 reporting for a measurement object ("Freq F1"), e.g., on which a fourth cell may be deployed. An A3 measurement may be triggered at the UE for the fourth cell, and the UE may provide an A3 measurement report for the fourth cell to the second cell.

Based at least in part on the A3 measurement report, the second cell may inform the third cell that the early conditional handover is aborted, which the third cell may confirm back to the second cell. The second cell may also provide a handover request to the fourth cell, which the fourth cell may accept and accordingly provide a handover ACK to the second cell. The second cell may provide a RRC Reconfiguration message configuring a handover to the fourth cell to the UE, and the UE may send a handover confirmation to the fourth cell. At this point, the UE may be in RRC connected state with the fourth cell. The UE may cancel the validity timer and discard the in-order early conditional handover set, e.g., due to the handover to a cell that is not in the in-order early conditional handover set.

In addition to routes known to the network, it may also be possible that a UE may predict or know in advance a route of the UE, which can also be used to support in-order conditional handover set configuration for the UE. For example, a UE might be able to determine a route to a destination towards which the UE is travelling (e.g., home, work, or any of various other destinations), such as might be suggested by a mapping tool executing on the UE. As another possibility, UEs embedded withing autonomous vehicles, delivery drones, aerial vehicles, etc., could be pre-programmed to travel along certain routes. Additionally, a UE may be able to learn user behavior, such as if a user habitually visits certain cells along a known route at certain days/times (e.g., weekdays around 9 AM, such as during a commute), and/or user input indicating predicted/expected route information could be provided by a user of a UE. Such information could be provided by a UE to the network as assistance information (e.g., as a list of global cell IDs in order of expected traversal, or in any of various other manners) to facilitate early conditional handover configuration for the UE by the network.

Such information could be provided using any of various signaling mechanism, which could be defined by a cellular communication standard according to which the UE communicates with the network, and/or could include a proprietary signaling mechanism defined between a UE and a network.

In some instances, the network may configure a backoff timer associated with such UE assistance information, e.g., to avoid excessively frequent UE assistance information updates. If not prevented by such a backoff timer, a UE may send UE assistance information that could include an in-order list of global cell IDs of cells that the UE expects to visit. Such information may assist the network in identifying cells to include in an in-order conditional handover set, e.g., if the UE is in RRC connected mode, or for identifying cell re-selection candidates for which the network may provide cell re-selection assistance information to the UE (e.g., as further described subsequently herein), e.g., if the UE is in RRC inactive or idle mode. The UE may also provide device type information (e.g., "RF/power limited", "embedded in-car device", "normal device", etc.), requested in-order conditional handover set parameters (e.g., threshold condition values, validity timer values, etc.), and/or any of various other information that may assist the network in selecting an in-order conditional handover set, including any parameters associated with it, for the UE.

The UE may provide such information at any of various intervals, as desired, e.g., in a periodic and/or event based manner. As previously noted, a UE may back off from sending such assistance information for at least the length of the configured backoff timer after previously providing such assistance information. If the configured backoff timer has a length of 0 or no backoff timer is configured, the UE may be able to send such assistance information as often as an update is triggered; for example, the UE may send out delta or new assistance information to modify a known route indicated in previously provided assistance information, e.g., in case a different route is chosen due to vehicular traffic delays, detours, or for any of various other possible reasons.

Alternatively or in addition, a UE could use such known route information for the UE internally (e.g., as part of baseband operations of the UE, potentially after obtaining such information from the application processor of the UE), e.g., to improve handover and/or cell re-selection efficiency, potentially even is a signaling mechanism to provide such information to the network is not available. For example, the UE could use such information to prioritize sending measurement reports for certain neighbors (e.g., that it expects to visit next along its expected route), which may help prompt the network to handover the UE to the cells to which the UE would like to be handed over. Similarly, such information could be used to prioritize re-selection candidates along the route based on internal database information of the UE. Such techniques may reduce the number of cell measurements that the UE needs to obtain when performing mobility, e.g., as it may be aware of the cells that it is expecting to encounter for handovers (e.g., in connected mode) and cell re-selections (e.g., in idle/inactive modes).

Figure 13:
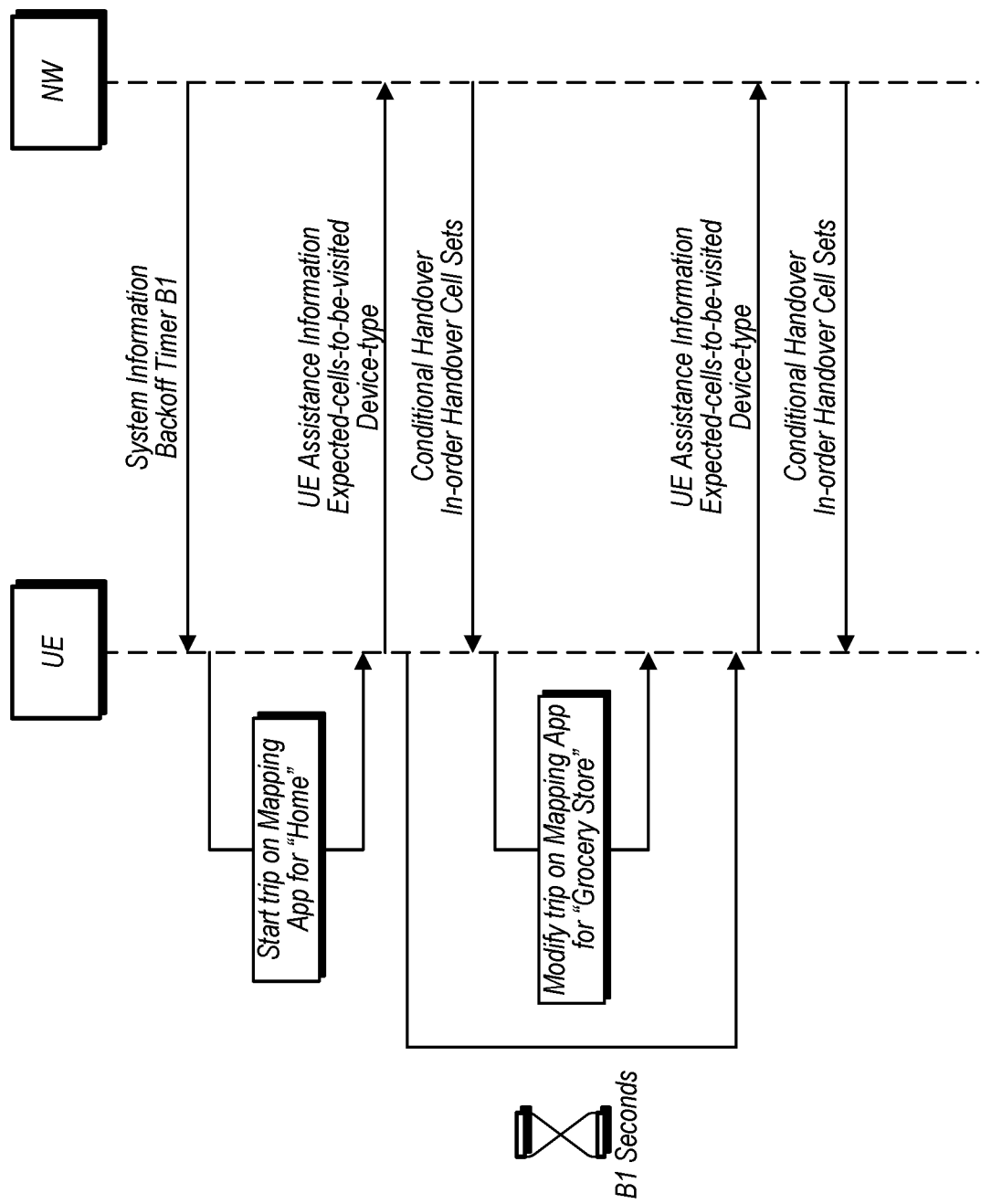
FIG. 13 is a message sequence chart illustrating possible signal flow in an exemplary scenario in which a wireless device provides information configured to assist with selecting a conditional handover set for the wireless device, according to some embodiments.

FIG. 13 is a message sequence chart illustrating possible signal flow in an exemplary scenario in which a wireless device provides information configured to assist with selecting a conditional handover set for the wireless device, according to some embodiments. As shown, the network may provide system information to the UE, which may indicate a backoff timer length for providing UE assistance information for expected-cells-to-be-visited. Subsequently, the UE may start a trip for a first destination (e.g., "home") on a mapping application on the UE. Based on this destination/route information, the UE may provide UE assistance information indicating one or more expected-cells-to-be-visited and a device-type parameter for the UE, and may initiate the backoff timer. The network may configure the UE to perform conditional handover, e.g., including providing one or more in-order early conditional handover sets, possibly based at least in part on the UE assistance information provided by the UE.

The UE may, however, modify the trip toward a second destination (e.g., "grocery store") on the mapping application. Once the backoff timer expires, the UE may provide updated UE assistance information, again including one or more expected-cells-to-be-visited and a device-type parameter for the UE, in this case based on the updated destination/route information. The network may reconfigure the UE to perform conditional handover, e.g., including providing one or more in-order early conditional handover sets, possibly based at least in part on the updated UE assistance information provided by the UE.

In addition (or alternatively) to configuring a UE with one or more conditional handover sets based on possible travel along one or more known routes, it may also be possible to use such information to improve cell re-selection along known routes. Such techniques may be particularly useful in at least some 5G NR deployments, e.g., since due to the potential size of the 5G NR cells/beams, it may be more likely that a UE travelling along a known route may more frequently be re-selecting between cells to maintain cellular service.

Thus, for known routes where mobility is expected (e.g., high speed train scenarios or any of the various other possible known route scenarios described herein, among various possibilities), it may be possible to take advantage of that knowledge, along with immediate system information block (SIB) availability, to obtain better cellular service retention (e.g., channel conditions from a source cell may deteriorate more quickly in high speed mobility scenarios, which could lead to many cell re-selections and MIB/SIB reads, that could fail in such high speed mobility scenarios, which may be avoided by pre-provisioning MIB/SIB information along a known route), power consumption savings for UEs (e.g., it may be possible to perform an optimized search for a selected set of neighbor cells along the known route rather than a more broad search for neighbors to which to potentially perform cell re-selection), and/or load balancing assistance for the network (e.g., the network may be able to guide a UE to stay on certain cells, as part of cell re-selection assistance information it provides for a known route, which may in turn increase the likelihood that connected mode transitions for the UE will occur on one of a set of cells preferred by the network, and/or the network may be able to reduce paging load by more aggressively paging for a UE in a small subset of cells and reduce the frequency of paging across the RNA in which the UE is located).

The cell re-selection assistance information could include an indication of the number of neighbor/route cell mandatory system information sets are being provided (e.g., ranging from 1 up to any desired maximum value). For each neighbor/route cell, mandatory system information may be provided. If the mandatory system information for all of the neighbor/route cells is common, the network may provide only one set of the mandatory system information, e.g., to minimize the payload data. If there are minor differences in the mandatory system information for one or more of the neighbor/route cells, the network may provide delta information (e.g., indicating differences from the serving cell system information and the route cell system information) for those cells.

In some instances, a "refresh timer" (MIB-value-tag-refresh-check-timer) length may be indicated for the cell re-selection assistance information, e.g., that may help track the freshness of the cell re-selection assistance information. If configured, such a timer may be started on receipt of the message by the UE. If the refresh timer has expired when the UE re-selects to a cell for which it has received mandatory system information from the cell re-selection assistance information, the UE may check for the MIB value-tag for the cell, and if it is different than the one stored from the cell re-selection assistance information, the UE may discard the neighbor/route cell system information from the cell re-selection assistance information, and obtain the system information from the cell directly.

As another possibility, it may be the case that a Q-offset-delta parameter is indicated for the cell re-selection assistance information. Such a parameter may facilitate re-selection to cells included in the cell re-selection assistance information at a higher priority than to other cells visible to the UE. For example, when re-selecting between cells, if multiple cells are seen, a cell for which system information is available from cell re-selection assistance information may be prioritized by applying the Q-offset-delta parameter when ranking cells according to cell re-selection criteria.

Such cell re-selection assistance information may be provided in any of a variety of ways. As one possibility, while the UE is in RRC connected state, an IE (e.g., that may be newly defined) could be provided in a RRC Reconfiguration message, or the information could be tunneled via a RRC connection release message for a set of neighbor/route cells. As another possibility, while the UE is in RRC idle or inactive state, such information could be broadcast (e.g., as part of Other-SI), or may be available by way of On-Demand SIB request (e.g., such that an interested UE could request the Other-SI as an on-demand SI). It may further be possible for such information to be provided by way of an evolved multimedia broadcast multicast services (eMBMS) broadcast, or a network infrastructure unit configured to provide one or more of unicast or broadcast information for vehicle-to-everything (V2X) communication.

Figure 14:
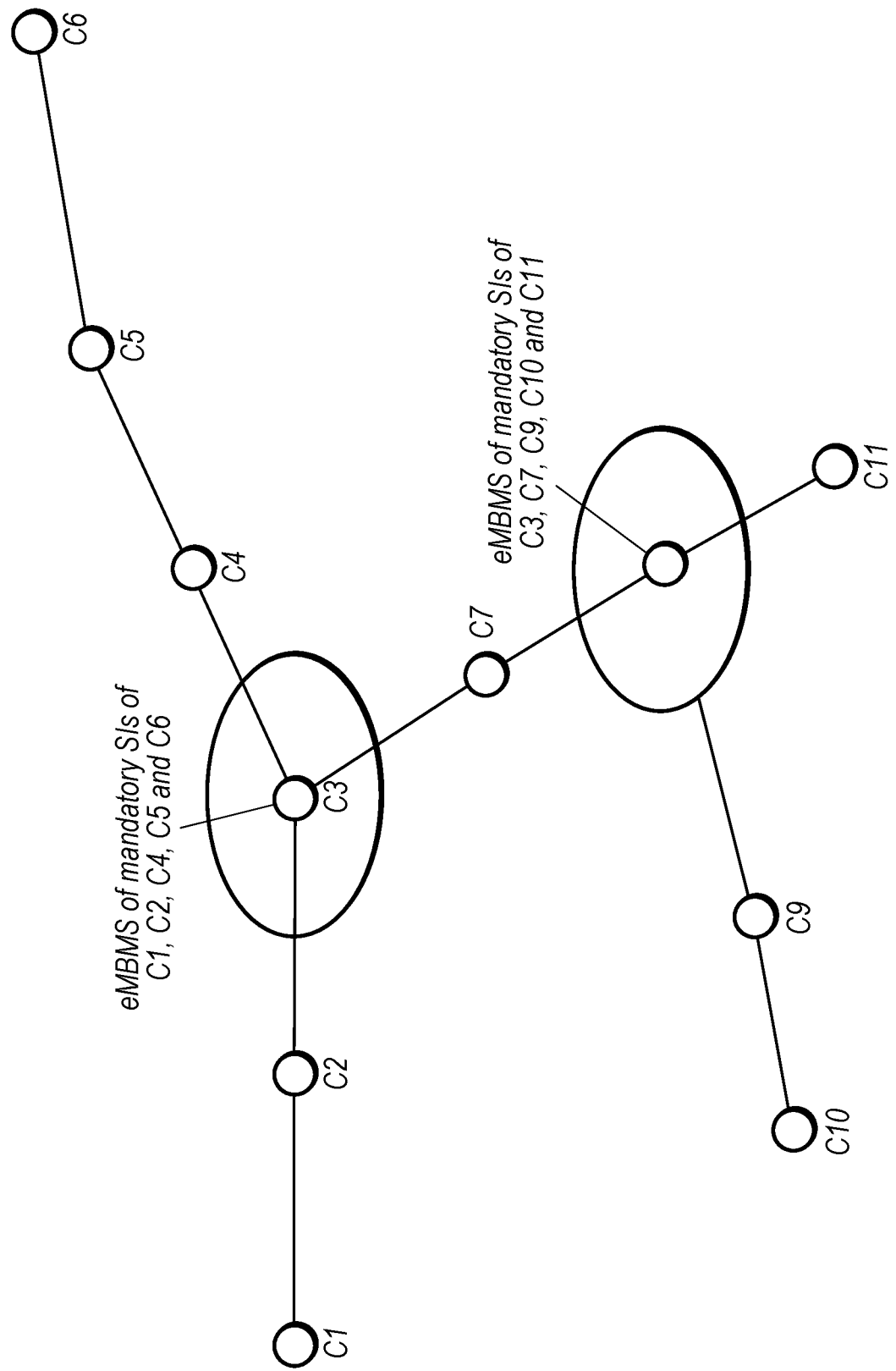
FIG. 14 illustrates aspects of an exemplary possible evolved multimedia broadcast multicast service delivery mechanism for providing cell re-selection assistance information for known routes, according to some embodiments.

FIG. 14 illustrates exemplary aspects of one such possible eMBMS delivery mechanism for providing mandatory system information for certain neighbor/route cells. As shown, a variety of cells C1-C11 may be deployed along several possible known routes. At those cells (e.g., C3, C8) deployed at junctions between the known routes, eMBMS broadcast stations may provide cell re-selection assistance information including mandatory system information for neighbor/route cells in their vicinities.

In the following further exemplary embodiments are provided.

One set of embodiments may include an apparatus, comprising a processing element configured to cause a wireless device to: establish a radio resource control (RRC) connection with a cellular base station; receive an in-order conditional handover set comprising information for a plurality of conditional handovers; and perform conditional handover to at least a first cell indicated in the in-order conditional handover set based at least in part on the in-order conditional handover set.

According to some embodiments, the in-order conditional handover set comprises ordered cell frequency and cell identification information for each of a plurality of cells, wherein the in-order conditional handover set further comprises threshold information indicating one or more threshold conditions to be met to perform the conditional handover.

According to some embodiments, to perform the conditional handover to at least the first cell indicated in the in-order conditional handover set, the processing element is further configured to cause the wireless device to: determine that one or more threshold conditions for the conditional handover are met; and transmit a handover confirmation to the first cell based at least in part on determining that the one or more threshold conditions for the conditional handover are met.

According to some embodiments, the in-order conditional handover set indicates one or more of: a serving cell signal strength threshold to trigger handover to a cell indicated in the in-order conditional handover set if met for at least a triggering period; a serving cell signal quality threshold to trigger handover to a cell indicated in the in-order conditional handover set if met for at least the triggering period; a hysteresis offset parameter between a serving cell a handover target cell to be met to perform conditional handover to a cell indicated in the in-order conditional handover set; or a validity timer indicating a maximum amount of time between handovers for the in-order conditional handover set.

According to some embodiments, the processing element is further configured to cause the wireless device to, after performing conditional handover to the first cell: perform conditional handover to at least a second cell indicated in the in-order conditional handover set based at least in part on the in-order conditional handover set.

According to some embodiments, the processing element is further configured to cause the wireless device to: discard the in-order conditional handover set based at least in part on one or more of: receiving an indication from a serving cell to cancel the in-order conditional handover set; receiving an indication from a serving cell of an updated in-order conditional handover set; receiving handover information indicating to perform handover to a cell that is not part of the in-order conditional handover set; releasing the RRC connection; detecting radio link failure that is not recovered on a same cell on which the radio link failure occurs; or successfully executing a last conditional handover specified in the in-order conditional handover set.

According to some embodiments, the processing element is further configured to cause the wireless device to: receive multiple in-order conditional handover sets, wherein each in-order conditional handover set comprises information for a plurality of conditional handovers.

According to some embodiments, the processing element is further configured to cause the wireless device to: determine an ordered set of candidate cells for an in-order conditional handover set; and transmit an indication of the ordered set of candidate cells to the cellular base station.

According to some embodiments, the ordered set of candidate cells is determined based at least in part on one or more of: a route to a destination associated with a mapping application in use at the wireless device; a pre-programmed travel route of the wireless device; or a predicted travel route of the wireless device determined based at least in part on previous wireless device use.

Another set of embodiments may include a wireless device, comprising: an antenna; a radio operably coupled to the antenna; and a processing element operably coupled to the radio; wherein the antenna, radio, and processing element are configured to: receive cell re-selection assistance information comprising system information for a plurality of cells; and perform cell re-selection to at least a first cell using the cell re-selection assistance information.

According to some embodiments, the antenna, radio, and processing element are further configured to: prioritize the plurality of cells indicated in the cell re-selection assistance information when performing cell re-selection.

According to some embodiments, the cell re-selection assistance information is received via one or more of: radio resource control (RRC) configuration information while the wireless device is in RRC connected mode; a RRC connection release message; system information broadcast by a serving cell of the wireless device while the wireless device is in RRC inactive or idle mode; on-demand system information requested by the wireless device; an evolved multimedia broadcast multicast services (eMBMS) broadcast; or a network infrastructure unit configured to provide one or more of unicast or broadcast information for vehicle-to-everything (V2X) communication.

According to some embodiments, the antenna, radio, and processing element are further configured to: determine an ordered set of candidate cells for in-order cell re-selection assistance information; and transmit an indication of the ordered set of candidate cells to a serving cell of the wireless device.

Yet another set of embodiments may include a cellular base station comprising: an antenna; a radio operably coupled to the antenna; and a processing element operably coupled to the radio; wherein the antenna, radio, and processing element are configured to: select a first conditional handover set for a wireless device, wherein the first conditional handover set comprises information for a first plurality of conditional handovers; and provide the first conditional handover set to the wireless device.

According to some embodiments, the first conditional handover set comprises cell frequency and cell identification information for a first ordered set of cells, wherein the first conditional handover set further comprises threshold information indicating one or more threshold conditions to be met to perform each conditional handover of the first plurality of conditional handovers, wherein the first conditional handover set further comprises a validity timer length indicating a configured maximum amount of time between handovers associated with the first conditional handover set.

According to some embodiments, the antenna, radio, and processing element are further configured to: select a second conditional handover set for a wireless device, wherein the second conditional handover set comprises information for a second plurality of conditional handovers; and provide the second conditional handover set to the wireless device, wherein the first conditional handover set and the second conditional handover set are provided to the wireless device together.

According to some embodiments, the antenna, radio, and processing element are further configured to: determine to cancel the first conditional handover set; and provide an indication to cancel the first conditional handover set based at least in part on determining to cancel the first conditional handover set.

According to some embodiments, the antenna, radio, and processing element are further configured to: select cell re-selection assistance information for a wireless device, wherein the cell re-selection assistance information comprises system information for a plurality of cells; and provide the cell re-selection assistance information to the wireless device.

According to some embodiments, the cell re-selection assistance information comprises: complete mandatory system information for at least one cell of the plurality of cells; delta information indicating differences from the complete mandatory system information for at least one cell of the plurality of cells; and a refresh timer length indicating a validity period for at least a portion of the cell re-selection assistance information.

According to some embodiments, the antenna, radio, and processing element are further configured to: receive an indication of the set of candidate cells for a conditional handover set from the wireless device; wherein the conditional handover set is selected based at least in part on the set of candidate cells for a conditional handover set.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

As described above, one aspect of the present technology is the gathering and use of data available from specific and legitimate sources to improve the handover and/or cell re-selection performance of a wireless device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to improve cellular service quality and reliability.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of use of route information to provide assistance information for determining a conditional handover set for a wireless device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a wireless device to:
communicate via a radio resource control (RRC) connection with a cellular base station;
receive an in-order conditional handover set comprising information for a plurality of conditional handovers, wherein the in-order conditional handover set specifies a first cell for handover from the cellular base station and a second cell for handover from the first cell;
determine a first condition for performing a conditional handover to the first cell in the in-order conditional handover set has been satisfied;
perform, responsive to determining the first condition has been satisfied, a conditional handover to the first cell without sending signaling to the cellular base station;
determine, after performing conditional handover to the first cell, a second condition for performing a conditional handover to a second cell indicated in the in-order conditional handover set has been satisfied; and
perform, responsive to determining the second condition has been satisfied, a conditional handover to the second cell without sending signaling to the cellular base station.

2. The apparatus of claim 1,
wherein the in-order conditional handover set comprises ordered cell frequency and cell identification information for each of a plurality of cells, wherein the in-order conditional handover set further comprises threshold information indicating one or more threshold conditions to be met to perform the conditional handover.

3. The apparatus of claim 1, wherein the in-order conditional handover set indicates one or more of:
a serving cell signal strength threshold to trigger handover to a cell indicated in the in-order conditional handover set if met for at least a triggering period;
a serving cell signal quality threshold to trigger handover to a cell indicated in the in-order conditional handover set if met for at least the triggering period;
a hysteresis offset parameter between a serving cell a handover target cell to be met to perform conditional handover to a cell indicated in the in-order conditional handover set; or
a validity timer indicating a maximum amount of time between handovers for the in-order conditional handover set.

4. The apparatus of claim 1, wherein the at least one processor is further configured to cause the wireless device to:
discard the in-order conditional handover set based at least in part on one or more of:
receiving an indication from a serving cell to cancel the in-order conditional handover set;
receiving an indication from a serving cell of an updated in-order conditional handover set;
receiving handover information indicating to perform handover to a cell that is not part of the in-order conditional handover set;
releasing the RRC connection;
detecting radio link failure that is not recovered on a same cell on which the radio link failure occurs; or
successfully executing a last conditional handover specified in the in-order conditional handover set.

5. The apparatus of claim 1, wherein the at least one processor is further configured to cause the wireless device to:
receive multiple in-order conditional handover sets, wherein each in-order conditional handover set comprises information for a plurality of conditional handovers.

6. The apparatus of claim 1, wherein the at least one processor is further configured to cause the wireless device to:
determine an ordered set of candidate cells for an in-order conditional handover set; and
transmit an indication of the ordered set of candidate cells to the cellular base station.

7. The apparatus of claim 6, wherein the ordered set of candidate cells is determined based at least in part on one or more of:
a route to a destination associated with a mapping application in use at the wireless device;
a pre-programmed travel route of the wireless device; or
a predicted travel route of the wireless device determined based at least in part on previous wireless device use.

8. A method, comprising:
communicating via a radio resource control (RRC) connection with a cellular base station;
receiving an in-order conditional handover set comprising information for a plurality of conditional handovers, wherein the in-order conditional handover set specifies a first cell for handover from the cellular base station and a second cell for handover from the first cell;
determining a first condition for performing a conditional handover to a first cell in the in-order conditional handover set has been satisfied;
performing, responsive to determining the first condition has been satisfied, a conditional handover to the first cell without sending signaling to the cellular base station;
determining, after performing conditional handover to the first cell, a second condition for performing a conditional handover to a second cell indicated in the in-order conditional handover set has been satisfied; and
performing, responsive to determining the second condition has been satisfied, a conditional handover to the second cell without sending signaling to the cellular base station.

9. The method of claim 8,
wherein the in-order conditional handover set comprises ordered cell frequency and cell identification information for each of a plurality of cells,
wherein the in-order conditional handover set further comprises threshold information indicating one or more threshold conditions to be met to perform the conditional handover.

10. The method of claim 8, wherein the in-order conditional handover set indicates one or more of:
a serving cell signal strength threshold to trigger handover to a cell indicated in the in-order conditional handover set if met for at least a triggering period;
a serving cell signal quality threshold to trigger handover to a cell indicated in the in-order conditional handover set if met for at least the triggering period;
a hysteresis offset parameter between a serving cell a handover target cell to be met to perform conditional handover to a cell indicated in the in-order conditional handover set; or
a validity timer indicating a maximum amount of time between handovers for the in-order conditional handover set.

11. The method of claim 8, further comprising:
discarding the in-order conditional handover set based at least in part on one or more of:
receiving an indication from a serving cell to cancel the in-order conditional handover set;
receiving an indication from a serving cell of an updated in-order conditional handover set;
receiving handover information indicating to perform handover to a cell that is not part of the in-order conditional handover set;
releasing the RRC connection;
detecting radio link failure that is not recovered on a same cell on which the radio link failure occurs; or
successfully executing a last conditional handover specified in the in-order conditional handover set.

12. The method of claim 8, further comprising:
receiving multiple in-order conditional handover sets, wherein each in-order conditional handover set comprises information for a plurality of conditional handovers.

13. The method of claim 8, further comprising:
determining an ordered set of candidate cells for an in-order conditional handover set; and
transmitting an indication of the ordered set of candidate cells to the cellular base station.

14. The method of claim 13, wherein the ordered set of candidate cells is determined based at least in part on one or more of:

a route to a destination associated with a mapping application in use;

a pre-programmed travel route; or a predicted travel route determined based at least in part on previous use.

15. A method, comprising:

selecting an in-order conditional handover set for a wireless device, wherein the in-order conditional handover set comprises information for a first plurality of conditional handovers, wherein the first plurality of conditional handovers comprise handover from a first cell to a second cell and handover from the second cell to a third cell;

transmitting, to the wireless device, the in-order conditional handover set; and providing an early handover request to the second cell for a first conditional handover from the first cell to the second cell, wherein providing the in-order conditional handover set to the wireless device and providing the early handover request to the second cell allows the wireless device to perform conditional handover from the first cell to the second cell without sending signaling to the first cell.

16. The method of claim 15, wherein the in-order conditional handover set comprises ordered cell frequency and cell identification information for each of a plurality of cells, wherein the in-order conditional handover set further comprises threshold information indicating one or more threshold conditions to be met to perform the conditional handover.

17. The method of claim 15, further comprising:

receiving, from the wireless device via the first cell, a handover confirmation.

18. The method of claim 15, wherein the in-order conditional handover set indicates one or more of:

a serving cell signal strength threshold to trigger handover to a cell indicated in the in-order conditional handover set if met for at least a triggering period; or a serving cell signal quality threshold to trigger handover to a cell indicated in the in-order conditional handover set if met for at least the triggering period.

19. The method of claim 15, wherein the in-order conditional handover set indicates a hysteresis offset parameter between a serving cell a handover target cell to be met to perform conditional handover to a cell indicated in the in-order conditional handover set.

20. The method of claim 15, wherein the in-order conditional handover set indicates a validity timer indicating a maximum amount of time between handovers for the in-order conditional handover set.

* * * * *